United States Patent
Haggerty et al.

(10) Patent No.: US 10,271,213 B2
(45) Date of Patent: Apr. 23, 2019

(54) METHODS AND APPARATUS FOR PROVIDING MANAGEMENT CAPABILITIES FOR ACCESS CONTROL CLIENTS

(75) Inventors: David T. Haggerty, Cupertino, CA (US); Jerrold Von Hauck, Windermere, FL (US); Kevin McLaughlin, Mountain View, CA (US); Audra Liu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/464,677

(22) Filed: May 4, 2012

(65) Prior Publication Data

US 2013/0122864 A1 May 16, 2013

Related U.S. Application Data

(60) Provisional application No. 61/483,582, filed on May 6, 2011.

(51) Int. Cl.
*H04W 12/08* (2009.01)
*H04W 12/06* (2009.01)
(Continued)

(52) U.S. Cl.
CPC ............ *H04W 12/08* (2013.01); *G06F 21/34* (2013.01); *G06F 21/77* (2013.01); *H04L 63/105* (2013.01);
(Continued)

(58) Field of Classification Search
CPC . H04L 2209/80; H04L 63/105; H04L 9/3234; H04L 63/0823; H04L 63/083;
(Continued)

(56) References Cited

U.S. PATENT DOCUMENTS 3,876,942 A 4/1975 Koster et al.
5,386,455 A 1/1995 Cooper
(Continued)

FOREIGN PATENT DOCUMENTS

WO 2010/123890 A1 10/2010

OTHER PUBLICATIONS

Kasper, Michael et al. "Subscriber Authentication in Cellular Networks with Trusted Virtual SIMs", Advanced Communication Technology, 2008. ICACT 2008. $10^{th}$ International Conference on, IEEE, Piscataway, NJ, USA, Feb. 17, 2008 (Feb. 17, 2008), pp. 903-908, XP031245274, ISBN: 978-89-5519-136-3.
(Continued)

*Primary Examiner* — Liton Miah
(74) *Attorney, Agent, or Firm* — Dickinson Wright RLLP (57) ABSTRACT

Methods and apparatus for managing access control clients (e.g., electronic Subscriber Identity Modules (eSIMs)). In one embodiment, secure elements (e.g., electronic Universal Integrated Circuit Cards (eUICCs)) and management entities of secure elements are associated with credentials. Post-deployment managerial operations can be executed, by transmitting the requested operation with the appropriate credentials. For example, a device can receive secure software updates to electronic Subscriber Identity Modules (eSIMs), with properly credentialed network entities.

20 Claims, 5 Drawing Sheets

(51) Int. Cl.
*H04L 29/06* (2006.01)
*G06F 21/34* (2013.01)
*G06F 21/77* (2013.01)
*H04W 88/02* (2009.01)

(52) U.S. Cl.
CPC ............ *H04L 63/20* (2013.01); *H04W 12/06* (2013.01); *G06F 2221/2141* (2013.01); *H04L 63/0823* (2013.01); *H04W 88/02* (2013.01)

(58) Field of Classification Search
CPC ... H04L 9/3247; H04L 9/32; H04L 2463/062; H04L 9/3263; H04L 9/3268; G06F 2221/2113; G06F 21/41; G06F 21/32; G06F 21/33; H04W 12/06; H04W 12/08; H04W 4/00
USPC .................................................. 455/410, 411
See application file for complete search history.

(56) References Cited

U.S. PATENT DOCUMENTS

| | | | |
|---|---|---|---|
| 5,835,061 A | 11/1998 | Stewart | |
| 6,134,435 A | 10/2000 | Zicker et al. | |
| 6,137,783 A | 10/2000 | Sailberg | |
| 6,185,427 B1 | 2/2001 | Krasner et al. | |
| 6,199,045 B1 | 3/2001 | Giniger et al. | |
| 6,259,405 B1 | 7/2001 | Stewart et al. | |
| 6,263,214 B1 | 7/2001 | Yazaki et al. | |
| 6,323,846 B1 | 11/2001 | Westerman et al. | |
| 6,456,234 B1 | 9/2002 | Johnson | |
| 6,487,403 B2 | 11/2002 | Carroll | |
| 6,570,557 B1 | 5/2003 | Westerman et al. | |
| 6,611,687 B1 | 8/2003 | Clark et al. | |
| 6,615,213 B1 | 9/2003 | Johnson | |
| 6,677,894 B2 | 1/2004 | Sheynblat et al. | |
| 6,677,932 B1 | 1/2004 | Westerman | |
| 6,731,238 B2 | 5/2004 | Johnson | |
| 6,879,825 B1 | 4/2005 | Daly | |
| 6,888,536 B2 | 5/2005 | Westerman et al. | |
| 7,054,642 B1 | 5/2006 | Matz et al. | |
| 7,187,997 B2 | 3/2007 | Johnson | |
| 7,359,516 B1 | 4/2008 | Skinner et al. | |
| 7,929,959 B2 | 4/2011 | De Atley et al. | |
| 8,032,181 B2 | 10/2011 | Hauck et al. | |
| 8,442,521 B2 | 5/2013 | Fleischman et al. | |
| 8,555,067 B2 | 10/2013 | Schell et al. | |
| 8,660,608 B2 | 2/2014 | Schell et al. | |
| 8,666,368 B2 | 3/2014 | Schell et al. | |
| 8,707,022 B2 | 4/2014 | Haggerty et al. | |
| 8,712,474 B2 | 4/2014 | Gehrmann | |
| 8,887,257 B2 | 11/2014 | Haggerty et al. | |
| 8,913,992 B2 | 12/2014 | Schell | |
| 8,924,715 B2 | 12/2014 | Schell et al. | |
| 8,996,002 B2 | 3/2015 | Rodgers et al. | |
| 9,009,475 B2 | 4/2015 | Hauck et al. | |
| 9,100,393 B2 | 8/2015 | Schell et al. | |
| 9,100,810 B2 | 8/2015 | Schell et al. | |
| 9,450,759 B2 | 9/2016 | Hauck et al. | |
| 9,451,450 B2 | 9/2016 | Fleischman et al. | |
| 2002/0082048 A1 | 6/2002 | Toyoshima | |
| 2002/0085530 A1 | 7/2002 | Toyoshima | |
| 2002/0197992 A1 | 12/2002 | Nizri et al. | |
| 2003/0083068 A1 | 5/2003 | Wong | |
| 2003/0119515 A1 | 6/2003 | Holler et al. | |
| 2004/0102183 A1 | 5/2004 | Haub et al. | |
| 2004/0121802 A1 | 6/2004 | Kim et al. | |
| 2004/0142725 A1 | 7/2004 | Kim | |
| 2004/0176133 A1 | 9/2004 | Lipsit | |
| 2004/0235458 A1 | 11/2004 | Walden et al. | |
| 2004/0242224 A1 | 12/2004 | Janik et al. | |
| 2004/0248550 A1 | 12/2004 | Hausner et al. | |
| 2004/0266336 A1 | 12/2004 | Patsiokas et al. | |
| 2005/0009502 A1 | 1/2005 | Little et al. | |
| 2005/0054338 A1 | 3/2005 | Hosokawa | |
| 2005/0079863 A1 | 4/2005 | Macaluso | |
| 2005/0120209 A1 | 6/2005 | Kwon et al. | |
| 2005/0141438 A1 | 6/2005 | Quetglas et al. | |
| 2005/0153741 A1 | 7/2005 | Chen et al. | |
| 2005/0239504 A1 | 10/2005 | Ishii et al. | |
| 2006/0035631 A1 | 2/2006 | White et al. | |
| 2006/0046717 A1 | 3/2006 | Bovell et al. | |
| 2006/0112423 A1* | 5/2006 | Villadiego ............... G06F 21/34 726/9 |
| 2006/0135144 A1 | 6/2006 | Jothipragasam | |
| 2006/0143098 A1 | 6/2006 | Lazaridis | |
| 2006/0154647 A1 | 7/2006 | Choi | |
| 2006/0205434 A1 | 9/2006 | Tom et al. | |
| 2007/0004386 A1 | 1/2007 | Singh et al. | |
| 2007/0082655 A1 | 4/2007 | Link et al. | |
| 2007/0167182 A1 | 7/2007 | Tenhunen et al. | |
| 2008/0003980 A1 | 1/2008 | Voss et al. | |
| 2008/0032682 A1 | 2/2008 | Jung et al. | |
| 2008/0064443 A1 | 3/2008 | Shin et al. | |
| 2008/0166993 A1 | 7/2008 | Gautier et al. | |
| 2008/0167027 A1 | 7/2008 | Gautier et al. | |
| 2008/0167036 A1 | 7/2008 | Bush et al. | |
| 2008/0260149 A1* | 10/2008 | Gehrmann .................... 380/247 |
| 2008/0261561 A1 | 10/2008 | Gehrmann | |
| 2008/0318550 A1 | 12/2008 | DeAtley | |
| 2009/0061840 A1 | 3/2009 | Fleischman et al. | |
| 2009/0061934 A1* | 3/2009 | Hauck ................... H04W 8/265 455/558 |
| 2009/0181662 A1* | 7/2009 | Fleischman ........... H04W 8/183 455/419 |
| 2009/0205028 A1 | 8/2009 | Smeets et al. | |
| 2010/0153713 A1* | 6/2010 | Klein ................... H04L 9/0891 713/158 |
| 2010/0162370 A1* | 6/2010 | Altay et al. ........................ 726/5 |
| 2010/0311391 A1 | 12/2010 | Siu et al. | |
| 2011/0092253 A1 | 4/2011 | Amiel et al. | |
| 2011/0151836 A1* | 6/2011 | Dadu et al. .................... 455/411 |
| 2011/0162046 A1* | 6/2011 | Forster et al. .................... 726/4 |
| 2012/0108206 A1 | 5/2012 | Haggerty | |
| 2012/0108295 A1 | 5/2012 | Schell et al. | |
| 2012/0278869 A1* | 11/2012 | Guccione ............. H04L 63/102 726/5 |
| 2012/0297473 A1* | 11/2012 | Case ................... H04L 63/0823 726/10 |
| 2013/0205390 A1 | 8/2013 | Hauck et al. | |
| 2016/0366585 A1 | 12/2016 | Fleischman et al. | |

OTHER PUBLICATIONS

"TCG MPWG Mobile Reference Architecture. Specification version 1.0 Revision 1", TCG, Jun. 12, 2007 (Jun. 12, 2007), pp. 1-87, XP002516393, Retrieved from the Internet: URL: https://www.trustedcomputinggroup.org/specs/mobilephone/tcg-mobile-reference-architecture-1.0.pdf [retrieved on Feb. 23, 2009 (Feb. 23, 2009)].
PCT Patent Application No. PCT/US2012/036647—International Search Report and Written Opinion dated Jul. 6, 2012.

* cited by examiner

METHODS AND APPARATUS FOR PROVIDING MANAGEMENT CAPABILITIES FOR ACCESS CONTROL CLIENTS

PRIORITY

This application claims priority to U.S. Provisional Patent Application No. 61/483,582 filed May 6, 2011 of the same title, the foregoing being incorporated herein by reference in its entirety.

RELATED APPLICATIONS

This application is related to co-owned, co-pending U.S. patent application Ser. No. 13/080,558 filed on Apr. 5, 2011, and entitled "APPARATUS AND METHODS FOR CONTROLLING DISTRIBUTION OF ELECTRONIC ACCESS CLIENTS", Ser. No. 12/952,082 filed on Nov. 22, 2010 and entitled "WIRELESS NETWORK AUTHENTICATION APPARATUS AND METHODS", Ser. No. 12/952,089 filed on Nov. 22, 2010 and entitled "APPARATUS AND METHODS FOR PROVISIONING SUBSCRIBER IDENTITY DATA IN A WIRELESS NETWORK", Ser. No. 12/980,232 filed on Dec. 28, 2010 and entitled "VIRTUAL SUBSCRIBER IDENTITY MODULE DISTRIBUTION SYSTEM", and Ser. No. 12/353,227 filed on Jan. 13, 2009, and entitled "POSTPONED CARRIER CONFIGURATION", and U.S. Provisional Patent Application Ser. Nos. 61/472,109 filed Apr. 5, 2011 and entitled "APPARATUS AND METHODS FOR STORING ELECTRONIC ACCESS CLIENTS", 61/472,115 filed on Apr. 5, 2011, and entitled "APPARATUS AND METHODS FOR DISTRIBUTING AND STORING ELECTRONIC ACCESS CLIENTS", 61/407,858 filed on Oct. 28, 2010 and entitled "METHODS AND APPARATUS FOR ACCESS CONTROL CLIENT ASSISTED ROAMING" (now U.S. patent application Ser. No. 13/109,851 filed on May 17, 2011, of the same title), 61/407,861 filed on Oct. 28, 2010 and entitled "MANAGEMENT SYSTEMS FOR MULTIPLE ACCESS CONTROL ENTITIES" (now U.S. patent application Ser. No. 13/079,614 filed on Apr. 4, 2011, of the same title"), 61/407,862 filed on Oct. 28, 2010 and entitled "METHODS AND APPARATUS FOR DELIVERING ELECTRONIC IDENTIFICATION COMPONENTS OVER A WIRELESS NETWORK" (now U.S. patent application Ser. No. 13/111,801 filed on May 19, 2011, of the same title), 61/407,866 filed on Oct. 28, 2010 and entitled "METHODS AND APPARATUS FOR STORAGE AND EXECUTION OF ACCESS CONTROL CLIENTS" (now U.S. patent application Ser. No. 13/080,521 filed on Apr. 5, 2011, of the same title), 61/408,504 filed on Oct. 29, 2010 and entitled "ACCESS DATA PROVISIONING SERVICE" (now U.S. patent application Ser. No. 13/078,811 filed on Apr. 1, 2011, and entitled "ACCESS DATA PROVISIONING APPARATUS AND METHODS"), 61/409,891 filed on Nov. 3, 2010 and entitled "METHODS AND APPARATUS FOR ACCESS DATA RECOVERY FROM A MALFUNCTIONING DEVICE" (now U.S. patent application Ser. No. 13/287,874 filed on Nov. 2, 2011, of the same title), 61/410, 298 filed on Nov. 4, 2010 and entitled "SIMULACRUM OF PHYSICAL SECURITY DEVICE AND METHODS" (now U.S. patent application Ser. No. 13/080,533 filed on Apr. 5, 2011, of the same title), and 61/413,317 filed on Nov. 12, 2010 and entitled "APPARATUS AND METHODS FOR RECORDATION OF DEVICE HISTORY ACROSS MULTIPLE SOFTWARE EMULATION" (now U.S. patent application Ser. No. 13/294,631 filed on Nov. 11, 2011, of the same titles), each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to managing access control clients and secure elements.

2. Description of Related Technology

Access control is required for secure communication in most prior art wireless radio communication systems. As an example, one simple access control scheme might comprise: (i) verifying the identity of a communicating party, and (ii) granting a level of access commensurate with the verified identity. Within the context of an exemplary cellular system (e.g., Universal Mobile Telecommunications System (UMTS)), access control is governed by an access control client, referred to as a Universal Subscriber Identity Module (USIM) executing on a physical Universal Integrated Circuit Card (UICC). The USIM access control client authenticates the subscriber to the UMTS cellular network. After successful authentication, the subscriber is allowed access to the cellular network. As used hereinafter, the term "access control client" refers generally to a logical entity, either embodied within hardware or software, suited for controlling access of a first device to a network. Common examples of access control clients include the aforementioned USIM, CDMA Subscriber Identification Modules (CSIM), IP Multimedia Services Identity Module (ISIM), Subscriber Identity Modules (SIM), Removable User Identity Modules (RUIM), etc.

Traditionally, the USIM (or more generally "SIM") performs the well known Authentication and Key Agreement (AKA) procedure, which verifies and decrypts the applicable data and programs to ensure secure initialization. Specifically, the USIM must both (i) successfully answer a remote challenge to prove its identity to the network operator, and (ii) issue a challenge to verify the identity of the network.

Existing SIM solutions consist of one or more SIM software identities that are "hardcoded" to a physical UICC card media; i.e., the SIM card assembly cannot be re-programmed, etc. Moreover, for all practical intents and purposes, prior art SIM cards are indivisible; that is, the SIM software is inseparable from the physical UICC card media. Consequently, certain operations cannot be performed within the existing SIM card framework. For example, a SIM cannot be moved between SIM cards, modified, revoked, and/or enabled for different network carriers. For reasons described in greater detail subsequently herein, existing SIM card solutions have become increasingly inadequate for the evolving complexities of cellular technologies (and other wireless technologies).

Accordingly, new solutions are needed for post-deployment SIM management capabilities.

SUMMARY OF THE INVENTION

The present invention satisfies the aforementioned needs by providing improved apparatus and methods for managing access control clients, including in a post-deployment environment.

In one aspect of the present invention, a wireless apparatus is disclosed. In one embodiment, the wireless apparatus includes one or more wireless links configured to communicate with at least one network, a secure element configured to store an access control client, an interface to the secure element, the interface having one or more credentials associated therewith, a processor, and a storage device in data communication with the processor, the storage device comprising computer-executable instructions.

In one variant the computer-executable instructions are configured to, when executed, receive an access attempt to at least one of the access control client and secure element, the access attempt further comprising a submitted credential, attempt to verify the submitted credential with the one of more associated credentials, and enable the access attempt when the submitted credential is successfully verified.

In a second variant, the computer-executable instructions further comprise instructions which when executed, determine a level of access allowed based at least in part on the submitted credential, and grant only the access allowed based at least in part on the determined level of access.

In a third variant, the access attempt is accompanied by a software package configured to perform an operation. The operation has for example a respective level of access, and is only performed if the level of access is allowed.

In another variant, the operation to be performed is one or more of: (i) activation or deactivation at least the access control client, (ii) a change account information (iii) locking of the secure element to a particular network provider, (iv) unlocking of the secure element from a particular network provider, and/or (v) installation of a software component.

In a further variant, the access control client comprises an electronic Subscriber Identity Module (eSIM).

In a second aspect of the invention, a method for managing one or more access control clients is disclosed. In one embodiment, the method includes: receiving a request to access a secure element and one or more access control clients, the request being accompanied by one or more access credentials; determining based at least in part on the received one or more access credentials, when access the secure element and the one or more access control clients is authorized; and providing access to the requested secure element and the one or more access control clients based at least in part on the determination.

In one variant, the method further includes executing one or more managerial operations, the one or more managerial operations being part of the request for access. The one or more managerial operations have, in one implementation, a respective one or more permission levels.

In a second variant, the individual ones of the one or more managerial operations are only executed if the respective permission level therefor are permitted by the determined access level associated with the received one or more access credentials.

In a third variant, the one or more managerial operations are one or more of: (i) installation of an access control client, (ii) deletion of an access control client, (iii) modification of an access control client, and/or (iv) update of one or more software elements.

In a fourth variant, the one or more access control clients comprise electronic Subscriber Identity Modules (eSIMs).

In a fifth variant, the determination includes determination of an access level associated with the received one or more access credentials.

In a third aspect of the invention, a mobile device is disclosed. In one embodiment, the device includes a processor, a secure element configured to store one or more access control clients, one or more wireless interfaces configured to communicate with at least one wireless network using the one or more access control clients; and a storage device in data communication with the processor, the storage device comprising computer-executable instructions.

In one variant, the computer-executable instructions are configured to, when executed, receive a request for access to the secure element, the request for access including at least one credential, and allow the requested access upon a determination that the at least credential has access privileges to the requested secure element.

In a second variant, the computer-executable instructions further comprise instructions configured to, when executed, evaluate access rights associated with the at least one credential, permit only actions associated with the request for access which are allowed by the evaluated access rights, and perform the permitted actions.

In a third variant, the one or more access control clients comprise electronic Subscriber Identity Modules (eSIMs).

In a fourth aspect of the invention, a computer-readable apparatus is disclosed. In one embodiment the computer-readable apparatus includes a storage medium having a plurality of instructions disposed thereon, the instructions configured to, when executed by a processor of a host device, receive a request to access a secure element, the secure element configured to store one or more access control clients, evaluate access rights information provided as part of the request to determine whether the access rights information is approved to access the secure element, and grant access to the secure element upon a determination that the access is approved.

In a first variant, the one or more access control clients comprise electronic Subscriber Identity Modules (eSIMs).

In a second variant, the request to access the secure element is accompanied by a request to access one or more access control clients.

In a third variant, the instructions are further configured to, when executed by the processor, evaluate access rights associated with the request to access the one or more access control clients, and permit access to the one or more access control clients upon a determination that the access is approved, wherein the request to access the one or more access clients includes an operation to be performed on the one or more access clients.

In a fifth aspect of the present invention, a network apparatus is disclosed.

Other features and advantages of the present invention will immediately be recognized by persons of ordinary skill in the art with reference to the attached drawings and detailed description of exemplary embodiments as given below.

All Figures © Copyright 2011-2012 Apple Inc. All rights reserved.

DETAILED DESCRIPTION OF THE INVENTION

Reference is now made to the drawings, wherein like numerals refer to like parts throughout.

Overview

The present invention provides, inter alia, methods and apparatus for managing access control clients (e.g., electronic Subscriber Identity Modules (eSIMs)) and secure elements (e.g., electronic Universal Integrated Circuit Card (eUICC)). In a first aspect of the invention, a secure element and/or management entities of secure elements maintain a set of credentials to assist in administrative transactions. A credential may be a certificate issued by a Certificate Authority (CA) that is associated with one or more levels of access. For example, in one exemplary embodiment, network carriers, eUICC appliances, eSIM depots, and Original Equipment Manufacturers (OEMs), etc.) possess credentials that enable appropriate management capabilities to mobile devices that are "in the field" (post-deployment).

Similarly, an access control client can be modified and managed by network entities with appropriate credentials. For instance, a mobile device can and/or authorize a trusted eSIM profile manager to perform various administrative functions. Trusted eSIM profile managers may be allowed to modify, add, delete, etc. various eSIMs stored within a mobile device's eUICC. Other exemplary credentials having a range of functional capabilities and/or access rights or restrictions are described in greater detail herein as well.

Moreover, in another exemplary embodiment, both secure elements and access control clients include credentials and information useful for, inter alia: receiving and granting various access rights based on submitted credentials, and/or submitting and requesting various access rights based on one or more appropriate credentials.

Various other scenarios for managing both access control clients and secure elements are also described in greater detail herein.

DETAILED DESCRIPTION OF EXEMPLARY EMBODIMENTS

Exemplary embodiments and aspects of the present invention are now described in detail. While these embodiments and aspects are primarily discussed in the context of Subscriber Identity Modules (SIMs) of a GSM, GPRS/EDGE, or UMTS cellular network, it will be recognized by those of ordinary skill that the present invention is not so limited. In fact, the various aspects of the invention are useful in any wireless network (whether cellular or otherwise) that can benefit from the secure modification, storage and execution of access control entities or clients.

It will also be recognized that while the term "subscriber identity module" is used herein (e.g., eSIM), this term in no way necessarily connotes or requires either (i) use by a subscriber per se (i.e., the invention may be practiced by a subscriber or non-subscriber); (ii) identity of a single individual (i.e., the invention may be practiced on behalf of a group of individuals such as a family, or intangible or fictitious entity such as an enterprise); or (iii) any tangible "module" equipment or hardware.

Prior Art Subscriber Identity Module (SIM) Operation—

Within the context of prior art UMTS cellular networks, a User Equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services. The USIM software is based on the Java Card™ programming language. Java Card is a subset of the Java™ programming language that has been modified for embedded "card" type devices (such as the aforementioned UICC).

Generally, UICCs are programmed with a USIM prior to subscriber distribution; the pre-programming or "personalization" is specific to each network operator. For example, before deployment, the USIM is associated with an International Mobile Subscriber Identify (IMSI), a unique Integrated Circuit Card Identifier (ICC-ID) and a specific authentication key (K). The network operator stores the association in a registry contained within the network's Authentication Center (AuC). After personalization the UICC can be distributed to subscribers.

Figure 1:
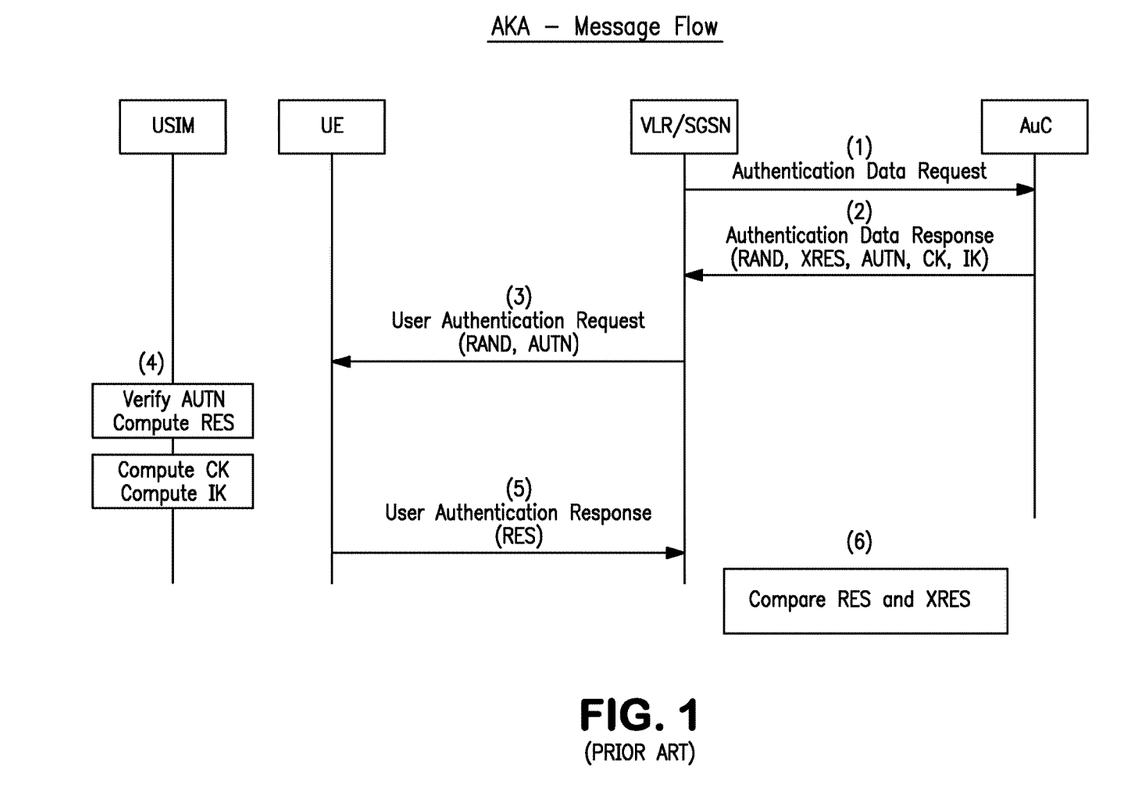
FIG. 1 is a graphical representation of one exemplary Authentication and Key Agreement (AKA) procedure using a prior art USIM.

Referring now to FIG. 1, one exemplary Authentication and Key Agreement (AKA) procedure using the aforementioned prior art USIM is illustrated in detail. During normal authentication procedures, the UE acquires the International Mobile Subscriber Identify (IMSI) from the USIM. The UE passes the IMSI to the Serving Network (SN) of the network operator or the visited core network. The SN forwards the authentication request to the AuC of the Home Network (HN). The HN compares the received IMSI with the AuC's registry and obtains the appropriate K. The HN generates a random number (RAND) and signs it with K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE receives the RAND and AUTN, the USIM verifies if the received AUTN is valid. If so, the UE uses the received RAND to compute its own response (RES) using the stored K and the same algorithm that generated the XRES. The UE passes the RES back to the SN. The SN compares the XRES to the received RES and if they match, the SN authorizes the UE to use the operator's wireless network services.

Example Operation

Various aspects of the present invention are now discussed with respect to one exemplary implementation. In the context of this exemplary implementation, instead of using a physical UICC as in the prior art, the UICC is emulated as a virtual or electronic entity such as e.g., a software application, hereafter referred to as an Electronic Universal Integrated Circuit Card (eUICC), that is contained within a secure element (e.g., secure microprocessor or storage device) in the User Equipment (UE). The eUICC is capable of storing and managing multiple SIM elements, referred hereafter as Electronic Subscriber Identity Modules (eSIM). Each eSIM is a software emulation of a typical USIM, and contains analogous programming and user data associated therewith. The eUICC selects an eSIM based upon the eSIM's ICC-ID. Once the eUICC selects the desired eSIM (s), the UE can initiate an authentication procedure to obtain wireless network services from the eSIM's corresponding network operator. Moreover, each eSIM application generally encompasses access control clients such as the aforementioned USIM, CSIM, ISIM, SIM, RUIM, etc. It is understood that each eSIM is associated with a user account, thus an "eSIM" may broadly encompass multiple access control clients (e.g., a user may have a USIM, and a SIM associated with the same eSIM account).

As previously described, the prior art USIM procedure uses a pre-shared key to authenticate to the Core Network (e.g., the aforementioned Home Network (HN), Serving Network (SN), and Authentication Center (AuC), etc.) Prior art solutions have been a "closed" system between the network operator and the mobile device. Specifically, physical SIM cards have been hardcoded for one function only i.e., authenticating the mobile device to the network operator.

However, with the advent of eSIM-based architectures, eSIMs can be made more flexible than hardware SIM cards; for example, as described in co-owned, co-pending U.S. patent application Ser. No. 13/093,722 filed Apr. 25, 2011, and entitled "APPARATUS AND METHODS FOR STORING ELECTRONIC SUBSCRIBER IDENTITY MODULES", previously incorporated by reference in its entirety eSIMs can be transferred among devices. As described in greater detail therein, each eUICC appliance can store and transfer eSIMs securely with other eUICC appliances. Moreover, as described in co-owned, co-pending U.S. patent application Ser. No. 13/095,716 filed Apr. 27, 2011 and entitled "SYSTEM FOR DISTRIBUTION OF UNIQUE SUBSCRIBER IDENTITY MODULES", and co-owned, U.S. Provisional Patent Application Nos. 61/479,319 filed Apr. 26, 2011 and entitled "ELECTRONIC ACCESS CLIENT DISTRIBUTION APPARATUS AND METHODS" (now U.S. patent Ser. No. 13/457,333 filed on Apr. 26, 2012, of the same title), each previously incorporated by reference in its entirety, various network architectures can leverage various attributes of eSIMs to provide flexible, and secure transfer of eSIMs among a distribution network.

In fact, unlike prior art monolithic networks (i.e., where each SIM card is adapted for operation with the specific network carrier only), the capabilities and flexibilities of eSIM-based network architectures introduce new technical and business niche areas including without limitation: manufacture, generation, maintenance and distribution of eSIMs. Consequently, as described in greater detail hereinafter, various aspects of the present invention relate to improved schemes for managing access control clients and secure elements.

In one exemplary embodiment, secure elements and access control clients are associated with, and maintain internal listings, of credentials that are trusted for various administrative actions. For example, the eUICC of each mobile device can verify the credentials for network entities, and authorize certain activities in accordance with the type and level of credential. As a brief aside, the term "credential" as used herein, broadly encompasses mechanisms adapted for authenticating a device, authorizing a level of access, and/or encrypting message exchanges. Common examples of credentials include but are not limited to shared cryptographic secrets (e.g., public/private key pair, private keys, signing keys, digital certificates, etc.), certificates, secure hashes, cryptographic residues, etc.

Furthermore, the term "profile" as used herein, broadly encompasses an account (e.g., a user account) associated with one or more access control clients and/or data. For example, an eSIM profile includes one or more eSIMs and a collection of personal data associated to a specific user or entity (e.g., a collection of users).

Profile Credentials—

In one embodiment of the present invention, a profile includes at least: (i) a profile manufacturer signature, (ii) one or more allowed profile appliance credentials, (iii) one or more profile depot policies. The profile is additionally associated with an access control client (e.g., eSIM).

The profile manufacturer signature (i) is generated from the contents of the profile at the time of creation. For example, in one such variant, the profile manufacturer signs the manufactured eSIM profile with a signing key that is unique to the eSIM profile manufacturer. The profile manufacturer's signature is a component of the eSIM profile, and is only accessible when the eSIM profile has been unencrypted (i.e., the encrypted eSIM profile and profile manufacturer signature can be safely stored in unsecured computer media, or at intermediate entities without exposing the eSIM profile's credentials and/or sensitive information). Once decrypted (i.e., within the secure element), the profile manufacturer signature is proof that the profile is valid (i.e., has not been tampered with).

During operation a secure element (e.g., eUICC) can verify that the profile is suitable for use, by verifying the profile manufacturer's signature. Similarly, the secure element can verify that various entities may or may not be granted access to the profile, based on known associations with the profile manufacturer's signature. For example, a first profile manufacturer can be granted access to modify, enable, disable, delete, etc. any profile which has the profile manufacturer's signature (i.e., only profiles manufactured by the profile manufacturer). However, the first profile manufacturer is prohibited from altering profiles which do not bear the profile manufacturer's signature.

The one or more allowed profile appliance credentials (ii) and profile depot policies (iii) elements determine which profile appliances and/or depots the profile can be stored. For example, in one exemplary embodiment, an eSIM profile can only be stored within a select group of profile appliances (or alternately, the eSIM profile may be restricted from storage at a select group of profile appliances). During an eSIM transfer, the eUICC determines if the eSIM can be transferred to the destination profile appliance; if the destination profile appliance is invalid, then the transfer aborts. In other exemplary implementations, the profile depot policy ensures that each eSIM profile can only be transferred within a specified depot infrastructure(s), etc. In some embodiments, policies may be suggestions, rather than restrictions (e.g., such suggestions may be preferred for business reasons, etc.)

More generally, profile credentials are associated with an access control client, and can be verified, by a secure element prior to executing the access control client. The profile credentials may also dictate how the access control client can be handled and/or devices that the access control client can be transferred to, or received from.

Secure Element Credentials—

In one exemplary embodiment of the invention, every secure element (e.g., eUICC) has an associated secure element credential. The secure element credential enables secure reception of messages from other devices. In one exemplary Public Key Infrastructure (PKI) based implementation, a eUICC device has credentials that include a private key, and a public key that is used in attestation and encryption. For example, as described within co-owned, co-pending U.S. patent application Ser. No. 13/080,521 filed Apr. 5, 2011, and entitled "METHODS AND APPARATUS FOR STORAGE AND EXECUTION OF ACCESS CONTROL CLIENTS", and co-owned, U.S. Provisional Patent Application No. 61/407,862 filed Oct. 28, 2011 and entitled "METHODS AND APPARATUS FOR DELIVERING ELECTRONIC IDENTIFICATION COMPONENTS OVER A WIRELESS NETWORK" (now U.S. patent application Ser. No. 13/111,801 filed on May 19, 2011, of the same title), each previously incorporated by reference in its entirety, the eUICC credentials include a public and private key pair. The private key can be used to decrypt the received encrypted packages, etc. The eUICC credential can initiate a secure "tunnel".

Once a secure connection has been set up with the secure element credential, additional credentials can be used to sign further exchanges to provide varying levels of access. For example, certain credentials may have specific functional capabilities, and/or access rights or restrictions. Such credentials may include, but are not limited to: (i) eUICC software platform credentials, (ii) profile policy credentials, (iii) eUICC profile manufacturer trust credentials, and/or (iv) OEM credentials, etc. Moreover, it is appreciated that various capabilities do not necessarily (but none-the-less may) overlap permissions to other capabilities. For example, certain credentials may enable software modification, whereas other credentials may be necessary for account management, the two credentials being entirely distinct from one another. These additional credentials may include a signed certificate, additional cryptography, etc.

In one such variant, the eUICC has a eUICC trust credential. The eUICC trust credential can be provided by the eUICC to other eUICCs or eUICC equivalent devices (e.g., profile appliances, etc.) to identify itself. For example, the eUICC trust credential can be a simple certificate issued by a Certificate Authority (CA). Similarly, received credentials can be verified and authorized by the eUICC based on a listing of allowed credentials (discussed in greater detail below)

Moreover, for every set of secure element credentials having the one or more capabilities, there is a complementary set of credentials associated with revocation and management of the one or more capabilities.

In one exemplary embodiment, a eUICC software platform credential enables trusted third party software developers to develop and distribute software patches and/or components. During operation, a network entity that presents a software platform credential (if successfully verified and authorized) can be trusted to provide software patches and/or components for a mobile device. In another such example, a profile policy credential can enable a party (such as a network carrier), to alter the eSIM profile policy (e.g., locking an eSIM to a network carrier, unlocking an eSIM to a network carrier, changing an eSIM to a different user account, etc.) This may find particular use in postponement type business schemes, such as those described within U.S. patent application Ser. No. 12/353,227 filed on Jan. 13, 2009, and entitled "POSTPONED CARRIER CONFIGURATION", previously incorporated by reference in its entirety.

In still other examples, various aspects of eSIM profiles and/or eUICC devices behavior can be modified with appropriate permissions. For instance, an eSIM profile manager credential can be used to verify/authenticate a trusted eSIM profile manager. Trusted eSIM profile managers are trusted to perform functions such as modify, add, delete, etc. various eSIMs stored within the eUICC. In some embodiments, the eSIM profile manager may further require administrative capabilities (i.e., access to all eSIMs on the device), or may be limited to various eSIMs associated with the eSIM profile manager, etc. In another such example, an OEM credential may enable a network entity to modify, add, delete, etc. the firmware associated with the eUICC device (non-specific to any particular eSIM). In some embodiments, the device manufacturer OEM credential may be synonymous with eSIM profile manager credentials, although this is by no means a requirement of practicing the invention.

Moreover, it is further appreciated that credentials may be required for communication between other network entities; for example, profile appliances may provide/receive credentials from other profile appliances to verify appliance to appliance transfers. Similarly, depots may provide/receive credentials from other depots, to verify depot to depot type transfers. Heterogenous transfers (e.g., appliance to depot and vice versa) may reuse existing credentials, or alternately may require a distinct set of specialized credentials.

Methods—

Figure 2:
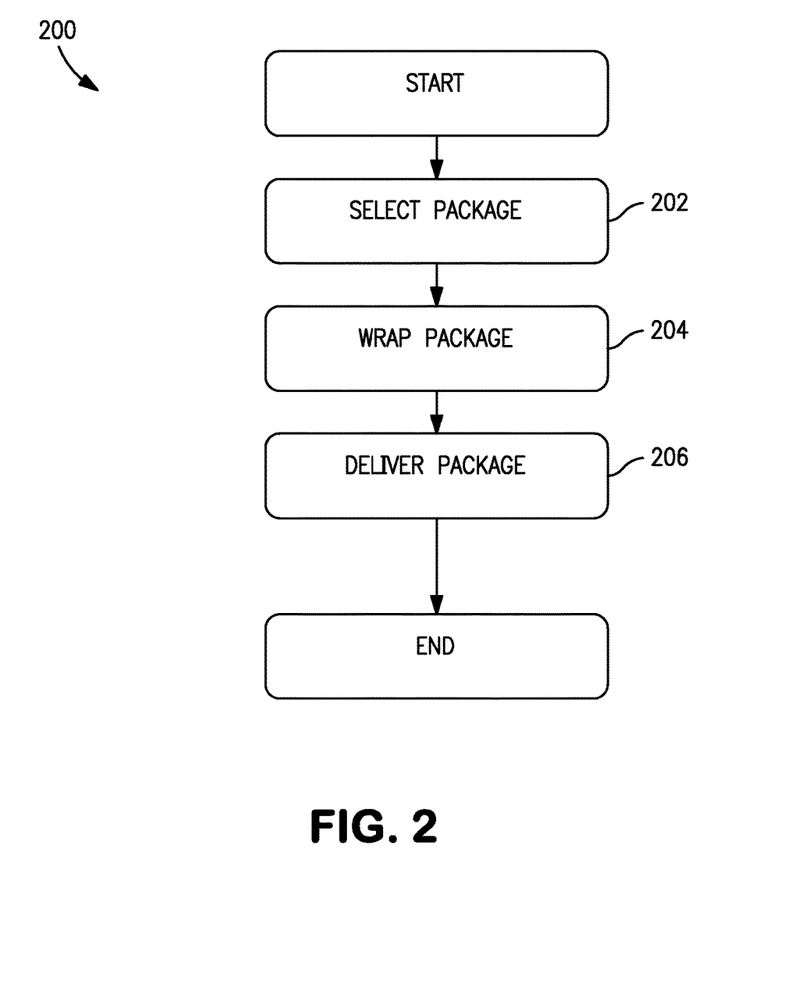
FIG. 2 is a logical flow diagram illustrating one embodiment of a method for managing access control clients according to the invention.

Referring now to FIG. 2, one embodiment of the generalized method 200 for managing access control clients and secure elements according to the invention is described.

At step 202 of the method 200, a package is selected for delivery to a device. In one approach, the package is requested by the device. In alternative embodiments, the package is directed for transmission to the device (e.g., by a supervisory entity, etc.) In some use cases, a network entity may initiate a transfer to implement one or more network administrative actions. In other typical use cases, a mobile device may request changes to an access control client, secure element, etc. Common examples of such requests include: activating an eSIM profile, deactivating an eSIM profile, changing account information, locking an eUICC to a particular carrier network, unlocking an eUICC from a carrier network, etc.

Furthermore, typical devices include, but are not limited to, mobile devices, profile appliances, profile depots, etc. Still other device types may include client devices, network entities, third party entities, and the like. Moreover, virtually any combination of device to device transaction may benefit from various attributes and capabilities of the present invention. For example, a mobile device can communicate with a profile appliance, a profile appliance may communicate with other profile appliances, a profile appliance may communicate with a depot, a mobile device can communicate with a depot, and so forth.

In one exemplary embodiment of the present invention, the package includes a command, message, software patch, component, and/or access control client. Various examples of commands include enabling, disabling, adding, removing, etc. a function or capability of an access control client profile, or secure element. Examples of messages include notifications, indications, warnings, error messages, etc.

Software patches may include various portions of source code, executable binaries, etc. to modify operation of an access control client, or the secure element.

Similarly, examples of components and/or access control clients include eSIM profiles in whole or in part (various eSIM profiles may include USIM, CSIM, RUIM personalities, etc.)

Referring again to FIG. 2, at step 204, the package is wrapped with the appropriate credential. As previously noted, credentials may include shared cryptographic secrets (e.g., public/private key pair, private keys, signing keys, digital certificates, etc.), certificates, secure hashes, etc. Various credentials are further associated with an appropriate access level. Common examples of properties may include: profiles activity (enabling/disabling a profile), profile accounting (associating a profile to a device, a customer, an account, etc.), profile capabilities (adding, deleting, modifying profile), etc. Moreover, various of the aforementioned properties may or may not overlap.

In one embodiment, a package is encrypted with a public key that is associated with access rights for modifying profile capabilities (where the encrypted package can only be decrypted with the private key associated with an appropriate access level). In other embodiments, a package is appended with a certificate that is associated with certain access rights, the combination being encrypted with a generic public key. In still other embodiments, the package may be encrypted with a first credential, and signed with one or more subsequent credentials. Yet other combinations are also possible (e.g., multiple certificates, multiple levels of cryptography, challenge response transactions, etc.)

Moreover, where several credentials are suitable, selection of the appropriate credential may be based on prescribed criteria, such as e.g., the minimal access level required for appropriate wrapping. For example, network entities having so-called "root" capabilities (i.e., all rights, and all capabilities) may opt to wrap with only the minimum level required. Furthermore, in some embodiments, credentials may be granted by an external entity. For example, in some scenarios, a third party entity may retrieve (or be granted) an appropriate certificate for a package.

At step 206 of the method 200, the package is transmitted to the device. Responsively, the device verifies the package and installs the package (see FIG. 3 and associated discussion). In some embodiments, the device may return confirmation of receipt. In yet other embodiments, the device may return confirmation of verification, and/or execution. In yet other embodiments, no confirmation is necessary.

Figure 3:
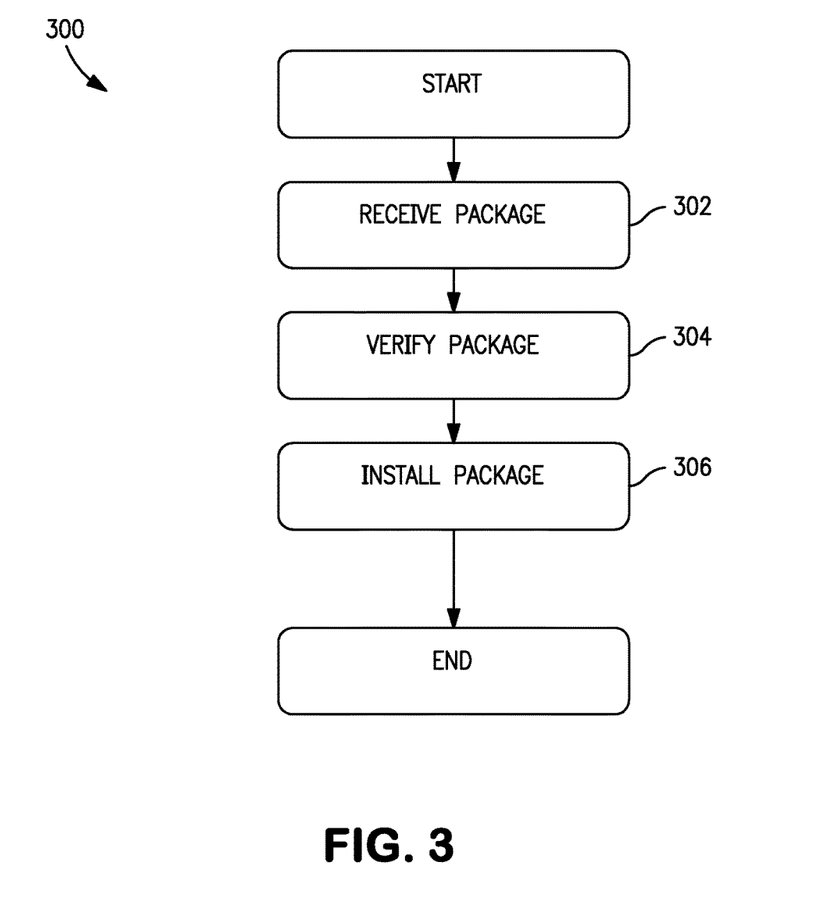
FIG. 3 is a logical flow diagram illustrating one embodiment of a method for verifying a package, and executing or installing the package according to one or more credentials according to the invention.

FIG. 3 illustrates one embodiment of the generalized method of the invention for verifying a package, and executing or installing the package according to one or more credentials.

At step 302 of the method 300, one or more packages are received, where each package is associated with one or more credentials. In one variant, the credentials are indicative of the level of access associated with the package. For example, a certificate can be used to identify its level of access. In alternate embodiments, the credential can be verified for an appropriate access level (i.e., where not explicitly indicated). For instance, a private key verifies an appropriate access level (only the proper public key can encrypt the package for the private key).

At step 304, the credential is verified and in some cases authorized. Verification of credentials may include, for instance, checking of a certificate, decrypting an encrypted message, etc. Proper verification of the credential may further include various secondary checks, such as for example, (i) verifying that the access level is commensurate with the received package, (ii) verifying that the access level is appropriate for the originating entity, and/or (iii) requesting verification from a device user, etc.

In some implementations of the method 300, mere verification alone is not sufficient. For example, in some cases a package may be offered by a verified party, but not authorized for installation. For example, in some embodiments, the secure element may not authorize offered changes (e.g., where a device has been locked to a policy)

In some embodiments, verification failure is ignored. For example, where a presented credential has an insufficient access level for the package, the package may be ignored and/or discarded. In yet other implementations, verification failures are flagged as errors, and additional attempts may be made to retry successful delivery of packages (e.g., for a prescribed number of re-attempts). In still other implementations, verification failures will result in revocation of credentials; for example, after a set number of verification failures the credentials associated with the source device are revoked (i.e., no further packages are accepted).

At step 306 of the method 300, the package is installed or executed in accordance with the verified credential. In some embodiments, installation history may also be stored for future reference if desired.

Exemplary Apparatus

Figure 4:
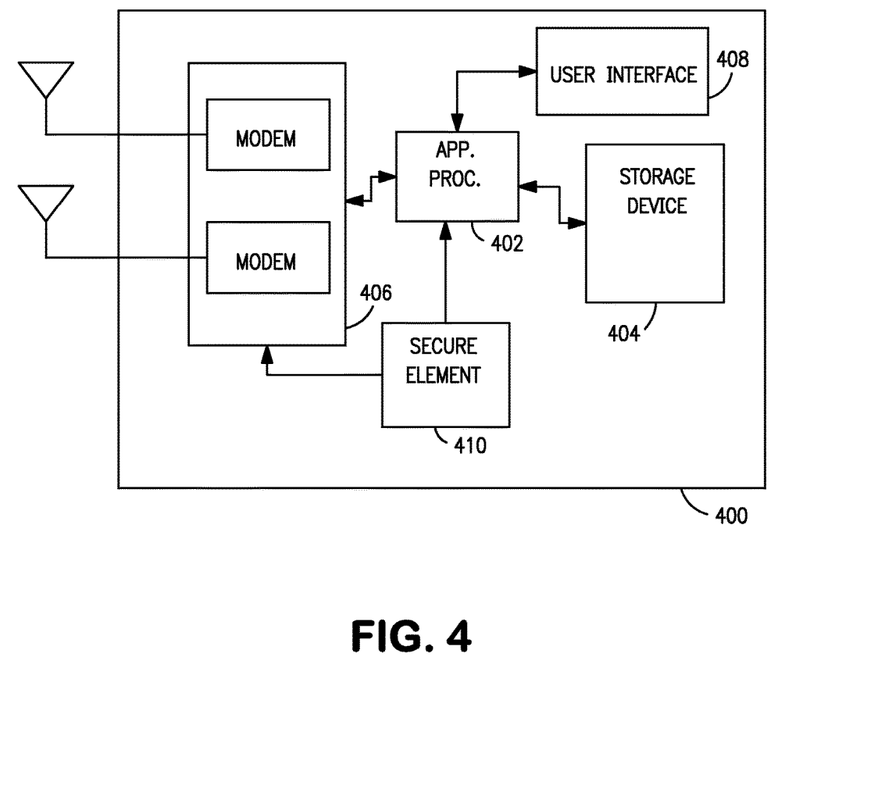
FIG. 4 is a block diagram of an exemplary apparatus useful for implementing the methods of the present invention.

Referring now to FIG. 4, one exemplary embodiment of an apparatus 400 according to, and useful for implementing the methods of, the present invention is illustrated.

The exemplary apparatus of FIG. 4 is a device with a processor subsystem 402 such as a digital signal processor, microprocessor, field-programmable gate array, or plurality of processing components mounted on one or more substrates. The processing subsystem may also comprise an internal cache memory. The processing subsystem is in data communication with a memory subsystem 404 comprising memory which may for example, comprise SRAM, flash and SDRAM components. The memory subsystem may implement one or a more of DMA type hardware, so as to facilitate data accesses as is well known in the art. The memory subsystem contains computer-executable instructions which are executable by the processor subsystem.

In one exemplary embodiment, the apparatus 400 can include of one or more interfaces (406) adapted to connect to one or more other devices. In some embodiments, the one or more interfaces include wireless interfaces such as GSM, CDMA, UMTS, LTE/LTE-A, WiMAX, WLAN (e.g., 802.11), Bluetooth, etc. by implementing the appropriate antenna and modem subsystems. Network or wired embodiments may implement wireline interfaces interfaces such as Ethernet, Gigabit Ethernet, optical transceivers, etc.

In some embodiments, the apparatus further comprises a user interface subsystem 408 that includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

In the illustrated embodiment, the device includes a secure element 410 which contains and operates a eUICC (electronic Universal Integrated Circuit Card) application. The eUICC is capable of storing and accessing a plurality of access control clients, where the access control clients are configured to authenticate the user (or user entity) to a respective network. The secure element is accessible by the memory subsystem at the request of the processor subsystem. The secure element may also comprise a so-called "secure microprocessor" or SM of the type well known in the digital security arts.

As a brief aside, a secure element may be embodied as a processor or processing apparatus executing software from a protected storage medium.

Figure 5:
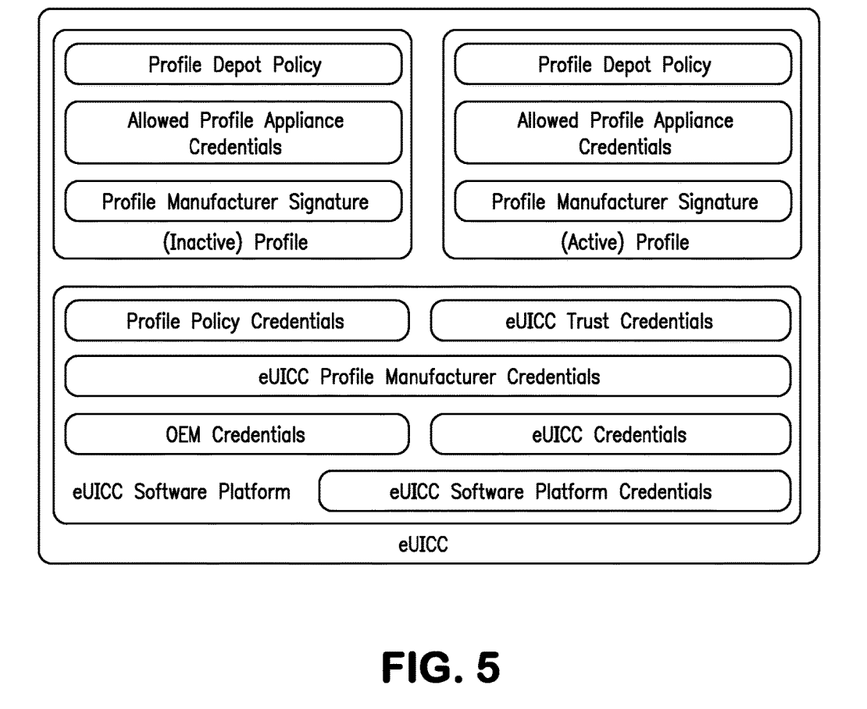
FIG. 5 is a block diagram of an exemplary software architecture useful for implementing the methods of the present invention.

FIG. 5 illustrates an exemplary software architecture useful for implementing the methods of the present invention. As illustrated, the eUICC application includes an eUICC software platform, and one or more profiles. The eUICC software platform includes without limitation: (i) profile policy credentials, (ii) eUICC trust credentials, (iii) eUICC profile manufacturer credentials, (iv) OEM credentials, (v) eUICC credentials, and (vi) eUICC software platform credentials. Each profile includes, inter cilia, a profile depot policy, an allowed profile appliance credentials, and a profile manufacturer's signature. During operation, only one profile is active.

Furthermore, realizations of the secure element are adapted for enabling access to various portions of the secure element based on one or more access levels associated with one or more corresponding credentials. For example, various credentials may enable message notification queues, software installation, data transfer, etc.

Still other realizations of the eUICC are adapted for accessing various portions of an external device based on one or more access levels associated with one or more credentials. For example, various credentials may enable message delivery, software delivery, data transfer, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A wireless apparatus, comprising:
a wireless interface; and
a secure element comprising:
  a secure processor, and
  a software platform comprising a plurality of credentials, wherein:
    i) an access control client (ACC) is present on the secure element,
    ii) the plurality of credentials are each associated with corresponding functional capabilities, and
    iii) the plurality of credentials comprises a profile policy credential for the ACC and enabling alteration of a profile policy for the ACC related to a network carrier lock for the ACC,
  wherein the secure processor is configured to:
    evaluate, based on the plurality of credentials, a first credential received by the wireless apparatus in a request, and
    when the evaluation indicates that an activity is authorized:
      perform the activity with respect to the ACC on the secure element.

2. The wireless apparatus of claim 1, wherein the ACC is an electronic Subscriber Identity Module (eSIM).

3. The wireless apparatus of claim 1, wherein the plurality of credentials comprises a software platform credential enabling acceptance of a software component.

4. The wireless apparatus of claim 3, wherein the secure processor is configured to perform the activity by installing, in the ACC on the secure element, the software component.

5. The wireless apparatus of claim 4, wherein the software component comprises executable software.

6. The wireless apparatus of claim 1, wherein the plurality of credentials comprises a device manufacturer credential.

7. The wireless apparatus of claim 6, wherein the secure processor is configured to perform the activity by adding or deleting secure element firmware that is non-specific to any particular ACC that is present on the secure element.

8. The wireless apparatus of claim 1, wherein the plurality of credentials comprises an electronic subscriber identity module (eSIM) profile manager credential.

9. The wireless apparatus of claim 8, wherein the secure processor is configured to perform the activity by deleting the ACC from the secure element.

10. The wireless apparatus of claim 1, wherein the plurality of credentials comprises an electronic subscriber identity module (eSIM) profile manufacturer credential.

11. The wireless apparatus of claim 10, wherein the secure processor is configured to perform the activity by modifying the ACC on the secure element.

12. A secure element, comprising:
a secure processor; and
a software platform comprising a plurality of credentials, wherein:
  i) an access control client (ACC) is present on the secure element,
  ii) the plurality of credentials are each associated with corresponding functional capabilities, and
  iii) the plurality of credentials comprises a profile policy credential for the ACC and enabling alteration of a profile policy for the ACC related to a network carrier lock for the ACC,
wherein the secure processor is configured to:
  evaluate, based on the plurality of credentials, a first credential received by a wireless apparatus in a request, wherein the secure element is housed in the wireless apparatus, and
  when the evaluation indicates that an activity is authorized:
    perform the activity with respect to the ACC on the secure element.

13. The secure element of claim 12, wherein the plurality of credentials comprises an electronic subscriber identity module (eSIM) profile manager credential.

14. The secure element of claim 12, wherein the secure processor is configured to alter the network carrier lock for the ACC by locking the ACC on the secure element to a specific network carrier.

15. The secure element of claim 12, wherein the plurality of credentials comprises a software platform credential enabling acceptance of a software component.

16. The secure element of claim 12, wherein the secure processor is configured to alter the network carrier lock for the ACC by unlocking the ACC on the secure element from a network carrier.

17. The secure element of claim 12, wherein the secure processor is configured to perform the activity by changing the ACC on the secure element to a different user account.

18. A method, comprising:
   by a secure element comprising a software platform:
      when evaluating a first credential indicates that an activity is authorized, wherein the evaluating is based on a plurality of credentials, and wherein:
         i) the first credential is received by a wireless apparatus hosting the secure element,
         ii) the plurality of credentials are each associated with corresponding functional capabilities,
         iii) the software platform comprises the plurality of credentials, and
         iv) the plurality of credentials comprises a profile policy credential for an access control client (ACC) that is present on the secure element and enabling alteration of the profile policy for the ACC related to a network carrier lock for the ACC:
      performing the activity with respect to the ACC on the secure element.

19. The method of claim 18, wherein the plurality of credentials comprises a software platform credential enabling acceptance of a software component.

20. The method of claim 19, wherein: i) the performing the activity comprises installing, in the ACC on the secure element, the software component, and ii) the software component comprises executable software.

* * * * *